United States Patent
Kozat et al.

(10) Patent No.: US 8,027,284 B2
(45) Date of Patent: Sep. 27, 2011

(54) METHOD AND APPARATUS FOR RELIABLE MULTICASTING IN WIRELESS RELAY NETWORKS

(75) Inventors: Ulas C. Kozat, Santa Clara, CA (US); Ismail Guvenc, Santa Clara, CA (US)

(73) Assignee: NTT DoCoMo, Inc., Tokyo (JP)

( * ) Notice: Subject to any disclaimer, the term of this patent is extended or adjusted under 35 U.S.C. 154(b) by 912 days.

(21) Appl. No.: 11/944,812

(22) Filed: Nov. 26, 2007

(65) Prior Publication Data

US 2008/0123579 A1 May 29, 2008

Related U.S. Application Data

(60) Provisional application No. 60/861,529, filed on Nov. 27, 2006.

(51) Int. Cl.
*H04H 20/71* (2008.01)
(52) U.S. Cl. .................................. 370/312; 370/282
(58) Field of Classification Search .......... 370/310–350, 370/252, 431, 432, 282; 714/748–750
See application file for complete search history.

(56) References Cited

U.S. PATENT DOCUMENTS

| 7,562,363 B1* | 7/2009 | Belair et al. ................. 718/102 |
| 2002/0116515 A1 | 8/2002 | Hashimoto |
| 2003/0128658 A1* | 7/2003 | Walton et al. ................. 370/208 |
| 2007/0195941 A1* | 8/2007 | Pedersen ..................... 379/177 |

OTHER PUBLICATIONS

International Preliminary Report on Patentability for PCT Patent Application No. PCT/US2007/024455, dated Jun. 11, 2009, 10 pages.

ANSI/IEEE Std 802.11, 1999 Edition (R2003)—Part 11: Wireless LAN Medium Access Control (MAC) and Physical Layer (PHY) Specifications.

IEEE Std 802.16a-2003, IEEE Standard for Local and metropolitan area networks—Part 16: Air Interface for Fixed Broadband Wireless Access Systems—Amendment 2: Medium Access Control Modifications and Additional Physical Layer Specifications for 2-11 GHz.

Akkor, G., Baras, J. S., and Hadjitheodosiou, M. "A Feedback Implosion Suppression Algorithm for Satellite Reliable Multicast." Proceedings of Globecom 2003, Dec. 2003.

Schulzrinne, H., Casner, S., Frederick, R., and Jacobson, V. "RTP: A Transport Protocol for Real-Time Applications," RFC 1889, Jan. 1996.

Handley, M. "An Examination of Mbone Performance." ISI Report, Jan. 10, 1997.

Paul, S., Sabnani, K. K., Lin, J. C., and Bhattacharyya, S. "Reliable Multicast Transport Protocol (RMTP)." IEEE *Journal on Selected Areas in Communications*, Apr. 1997.

(Continued)

*Primary Examiner* — Kwang B Yao
*Assistant Examiner* — Kenan Cehic
(74) *Attorney, Agent, or Firm* — Blakely, Sokoloff, Taylor & Zafman LLP

(57) ABSTRACT

A method and apparatus is disclosed herein for performing multi casting. In one embodiment, the method comprises receiving routing, association, relaying, and/or topology information associated with a plurality of nodes in a multi-hop wireless network, the plurality of nodes communicably coupled in a tree or mesh arrangement via a plurality of broadcast channels; and determining a subset of the plurality of nodes over each broadcast channel on the multi-hop wireless network that is responsible for sending acknowledgment information, in response to receipt or lack of receipt of transmissions, back to senders of transmissions.

22 Claims, 5 Drawing Sheets

OTHER PUBLICATIONS

Floyd, S., Jacobson, V., Liu, C., McCanne, S., and Zhang, L. "A Reliable Multicast Framework for Light-weight Sessions and Application Level Framing." ACM *Transactions on Networking*, Nov. 1996.

Farinacci, D., Lin, A., Speakman, T., and Tweedly, A. "PGM Reliable Transport Protocol Specification." Work in progress, Internet Draft, draft-speakman-pgm-spec-01.txt, Jan. 29, 1998.

Miller, K., Robertson, K., Tweedly, A., and White, M. "StarBurst Multicast File Transfer Protocol (MFTP) Specification." Work in progress, Internet Draft, draft-miller-mftp-spec-03.txt, Apr. 1998.

Kasera, S. K., Kurose, J., Towsley, D., "Scalable Reliable Multicast Using Multiple Multicast Groups." CMPSCI Technical Report TR 96-73, Oct. 1996.

J. Jannotti, D. K. Gifford, K. L. Johnson, M. F. Kaashoek, and J. W. O'Toole, "Overcast: Reliable Multicasting with an Overlay Network", In Proc. USENIX, San Diego, CA, Oct. 2000.

S. Pingali, D. Towsley, and J. F. Kurose, "A Comparison of Sender-Initiated and Receiver-Initiated Reliable Multicast Protocols", IEEE J. Select. Areas Commun., 15(3):398-406.

J. M. Pullen and V. P. Laviano, "A Selectively Reliable Transport Protocol for Distributed Interactive Simulation", in Proc. Distributed Interaction Simulation Workshop, Orlando, FL, Sep. 1995.

B. N. Levine and J. J. Garcia-Luna-Aceves, "A Comparison of Reliable Multicast Protocols", Springer Multimedia Systems, vol. 6, pp. 334-348, 1998.

J. Nonnenmacher, E. Biersack, and D. Towsley, "Parity-Based Loss Recovery for Reliable Multicast Transmission", IEEE Trans. Networking.

D. M. Moen and J. M. Pullen, "A Performance Measurement Approach for the Selectively Reliable Multicast Protocol for Distributed Simulation", in Proc. IEEE Distributed Interactive Simulation and Real-Time Systems Workshop, 2001.

D. Rubenstein, S. Kasera, D. Towsley, and J. Kurose, "Improving Reliable Multicast Using Acrive parity Encoding Services", ATM International Journal of Computer and Telecommunications Networking, pp. 63-78, Jan. 2004.

* cited by examiner

METHOD AND APPARATUS FOR RELIABLE MULTICASTING IN WIRELESS RELAY NETWORKS

PRIORITY

The present patent application claims priority to and incorporates by reference the corresponding provisional patent application Ser. No. 60/861,529, titled, "A Method and Apparatus for Reliable Multicasting in Wireless Relay Networks," filed on Nov. 27, 2006.

FIELD OF THE INVENTION

The present invention relates to the field of network multicasting; more particularly, the present invention relates to multicasting in multi-hop wireless networks that use wireless link layer protocols.

BACKGROUND OF THE INVENTION

Multicast routing is used to avoid duplicate transmission of the same packet over the same network link. Unlike unicast routing, where an incoming packet at a router is copied onto exactly one outgoing link that has a unique end point (i.e., node), in multicast routing a packet can be copied onto more than one link that each having a distinct end point or it can be copied on a broadcast interface (e.g., radio frequency (RF) wireless interface, Ethernet, etc.) with a multicast or broadcast address (e.g., MAC address) so that more than one end point can receive it. This process repeats itself at each node designated as multicast router or relay.

FIG. 1 illustrates an example of a network. Referring to FIG. 1, network 100 has four wireless routers, labeled as A, B, C, and D, and eight wireless client nodes 101-108 which are subscribed to the same multicast session (e.g., they listen to the same IP multicast address to receive the packets of the same session). Each of routers A-D and its downstream nodes (i.e., the nodes that receive multicast packets from this router) are connected through a broadcast medium and whenever a router sends a packet for a given multicast session, it utilizes a common broadcast channel listened to by all the downstream nodes and a session multicast address (e.g., IP multicast address assigned to the multicast session, connection ID assigned at the link layer, etc.). For purposes herein, the term "channel" can be physical such as time-slot, frequency band, spreading code, etc., it can be logical such as MAC broadcast/multicast address, or it can be a combination of both. Under ideal circumstances, the packet is transmitted once by the router and all the receivers correctly receive it. When routers B and C receive a multicast packet, they re-transmit the same packet to their downstream nodes in their corresponding broadcast channels (e.g., channels 2 and 3, respectively, in FIG. 1). When router D receives the packet sent by router B, it resends the same packet over the broadcast channel 4.

Unfortunately, this ideal mode of operation where each downstream node receives the information at the first time it is transmitted by the upstream router is not a realistic assessment especially when the broadcast medium is a wireless RF channel. Indeed, the successful reception of a packet becomes a probabilistic event that varies from one receiver to another. Therefore, while some of the downstream nodes can successfully receive a particular multicast packet, the remaining downstream nodes in fact may not receive it successfully. Since there may be a large number of receivers, it is not desirable to have each receiver notify the sender about successful transmissions by sending an acknowledgement (ACK) message. An ACK-based approach can significantly drain the bandwidth resources considering the fact that under good channel conditions, most of the receivers will receive and send back an ACK message. With this consideration, a negative ACK (NACK) based system can be utilized. However, there is ambiguity in terms of which receivers are going to send a NACK message in case more than one receiver have not received the packet correctly. One way is to allocate a slot (or sub-channel, sub-carrier, etc.) for each receiver, which may result in many unused bandwidth resources. Many systems utilize a random back-off procedure to resolve any conflicts, which makes NACK based approaches more efficient than ACK based approaches when fewer nodes have unsuccessful reception. One problem with NACK-based solutions is that the receiver node must be able to decode the MAC header correctly. To avoid such complications, many broadband wireless standards such as IEEE 802.11 or IEEE 802.16 do not impose a reliable multicast or broadcast transmission and no link layer (LL) retransmission mechanism (neither with ACK nor NACK) is supported in those modes of operation.

Broadband wireless standards such as 802.11 and 802.16 provide reliable link/MAC layer operations only for unicast transmissions, e.g., only one receiver is targeted to send the packet and each successful packet reception is acknowledged (ACKed) by that receiver. On the other hand, broadcast or multicast transmissions where more than one receiver is expecting the packet are executed in an unreliable fashion with no receipt acknowledgements.

Link layer reliability issue for multicast/broadcast flows has been investigated heavily for satellite links which mainly suffer from the high round trip time delay. Due to the high order of magnitude of the number of receivers in a satellite footprint, reliable multicasting and collecting feedback from each receiver pose a formidable task. The state of the art in the area is to use coding (fixed rate codes with incremental redundancy or rateless codes) and selection of feedback nodes in conjunction with one another. The selection of feedback nodes is generally done via tracking the subset of receivers with the worst case channel conditions. The tracking criterion can be as simple as the number of encoding packets required to be able to decode the multicast content or signal to noise ratio at the receivers. However, in satellite multicasting, the feedback is typically collected from receivers that have bad reception quality. Also, in satellite multicasting, a reliable link layer for all the receivers is targeted.

Many reliable multicast proposals exist for the transport layer. On such proposal is referred to as a reliable multicast transport protocol (RMTP) and achieves reliability by using a packet based selective repeat retransmission scheme. In particular, each ACK packet carries a sequence number and a bitmap, the receivers are grouped into a hierarchy of local regions, and a tree-topology is generated, where receivers in each local region periodically send ACKs to their parents. The ACK messages are transmitted to the parent nodes in the higher layer only, and the ACK-implosion problem is effectively reduced.

Another example of a multicast proposal involves the selectively reliable multicast protocol (SRMP) that has three modes of operation. The first mode is the best-effort transmission of the data which does not require reliable transport; the second mode requires reliable reception of the data by all nodes in the network; and the third mode requires that the data is received reliably by a single dynamically-selected node of the multicast group.

In another example, an application-level reliable multicasting system uses the Overcast technique in which an overlay network is used to provide scalable and reliable multicast by building efficient distribution trees that adapt to changing network conditions. The scalability and reliability is achieved using multiple multicast groups.

In another example, a scalable reliable multicast transmission is maintained by combining FEC with ARQ. In such a case, the FEC and ARQ are used for the retransmission of parity data to recover from the loss of original data packets.

SUMMARY OF THE INVENTION

A method and apparatus is disclosed herein for performing multicasting. In one embodiment, the method comprises receiving information associated with a plurality of nodes in a multi-hop wireless network, the plurality of nodes communicably coupled in an arrangement via a plurality of broadcast channels; and determining a subset of the plurality of nodes over each broadcast channel on the multi-hop wireless network that is responsible for sending acknowledgment information, in response to receipt or lack of receipt of transmissions, back to senders of transmissions.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

DETAILED DESCRIPTION OF THE PRESENT INVENTION

Figure 1:
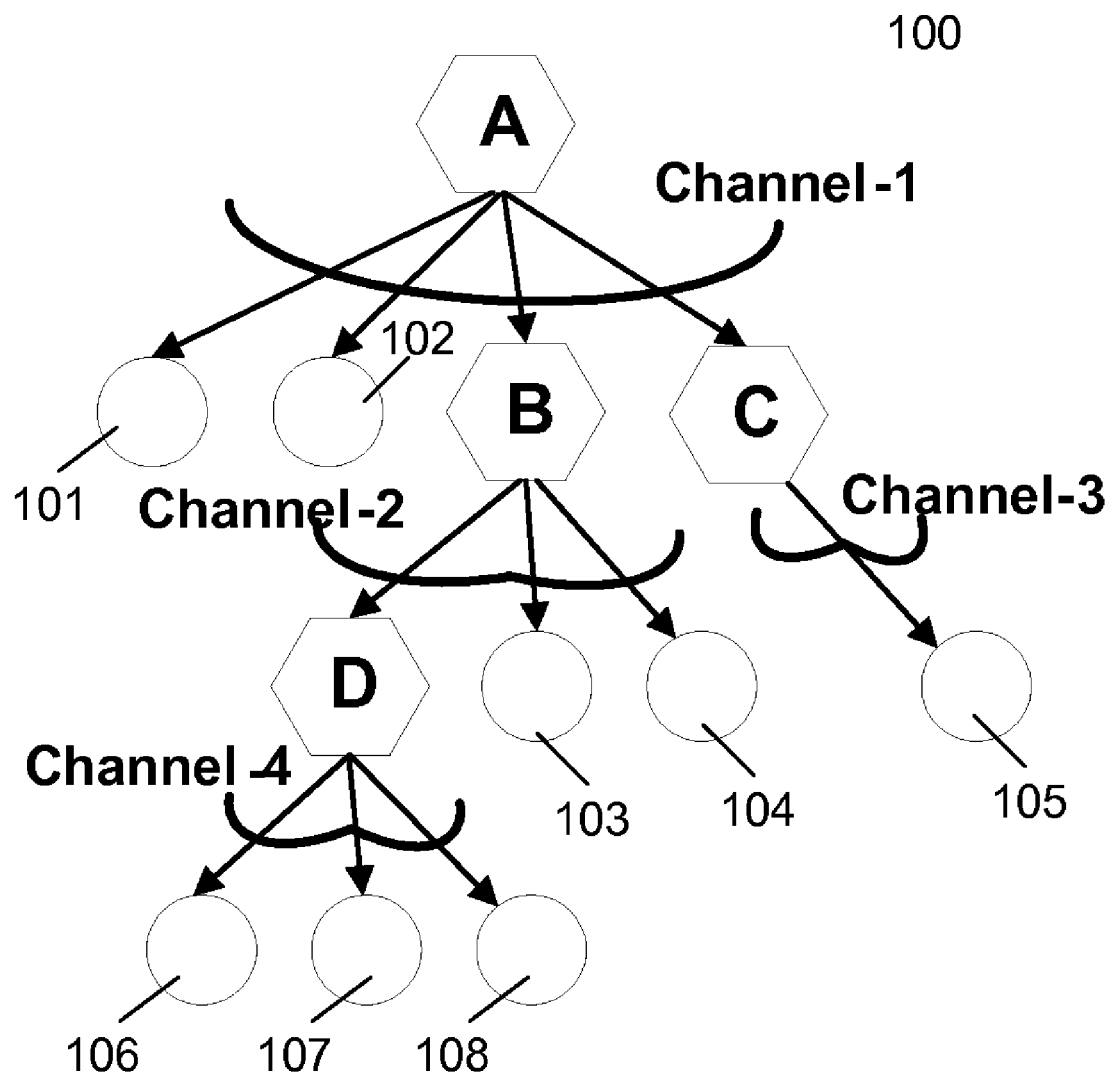
FIG. 1 illustrates an example of a multicast routing over shared medium through broadcast/multicast channels.

A reliable multicast framework that operates in a selective fashion over a subset of links on any constructed multicast tree is described. This framework provides a link layer solution that improves the reliability of multicasting via retransmissions in a network, where routers/relays utilize broadcast interface for multicast applications. The reliability amounts to link layer retransmissions over broadcast/multicast channels after receiving a negative acknowledgement (NACK) or not receiving a positive acknowledgement (ACK) within a time-out period from a-priori selected subset of intended receivers of the message.

In one embodiment, broadcast/multicast channels provide a mode of operation in which the messages transmitted by one sender over the shared wireless medium can be received simultaneously by multiple distinct receivers. In one embodiment, the method determines which subset of the receivers over each broadcast channel on a multi-hop wireless network is responsible for sending ACKs or NACKs back to an original sender of a transmission. This method also resolves the scheduling of ACKs or NACKs, i.e., the subset of nodes to send ACKs or NACKs are informed about this decision as well as the particular channel and time slot during which each member of the subset is eligible for sending its ACKs or NACKs.

In the following description, numerous details are set forth to provide a more thorough explanation of the present invention. It will be apparent, however, to one skilled in the art, that the present invention may be practiced without these specific details. In other instances, well-known structures and devices are shown in block diagram form, rather than in detail, in order to avoid obscuring the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. For convenience, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language. It will be appreciated that a variety of programming languages may be used to implement the teachings of the invention as described herein.

A machine-readable medium includes any mechanism for storing information in a form readable by a machine (e.g., a computer). For example, a machine-readable medium includes read only memory ("ROM"); random access memory ("RAM"); magnetic disk storage media; optical storage media; flash memory devices; etc.

Overview

A technique is disclosed that provides partial reliability for link-layer multicast/broadcast transmissions by a-priori selecting the set of nodes that are responsible for sending ACK (or NACK) messages. In one embodiment, the network employs selective reliable multicasting, where at each hop, only the relays with a significant number of downstream clients are designated as link layer feedback nodes (LLFNs). Any router that has at least one LLFN on its next hop waits for an ACK (or a NACK depending on which method is used in the system) from those nodes. If an ACK stage fails, the unacknowledged packet is retransmitted until it is successful or a preset number of retransmissions fail or the retransmission deadline expires. Alternatively, the techniques disclosed herein also allow more complex criterion that considers both the channel qualities observed at the receiving nodes and the serving capacities. Accordingly, this process provides reliable multicasting in certain routing directions that serve significant number of clients and/or that has weaker channel conditions.

In one embodiment, the downstream routers that effectively serve many clients are characterized as being more important than the individual end users that are at the same depth in multicast tree. For instance, in FIG. 1, router A is the root of the multicast tree. Routers B and C as well as client nodes 101 and 102 constitute the nodes that are 1-hop away from the root (hence they are depth-1 nodes). While clients (nodes) 101 and 102 do not serve any other nodes, router B must retransmit the multicast packets so that nodes 103, 104, 106, 107, and 108 can receive it. Thus, router B effectively serves 5 clients. Similarly, router C serves one client (105), while router D serves three clients (106-108), respectively. In this setting, router B becomes the most critical downstream node; if B does not receive a multicast packet, the failure propagates up to five clients. On the other hand, router C is not as critical, since a failure in its reception only impedes the quality of service (QoS) observed at a single client.

In one embodiment, the network comprises multiple gateway points, multiple wireless relays/routers, and multiple wireless/mobile clients. Clients can directly connect to one of the gateway points or they can connect to one of the wireless relays. In one embodiment, wireless relays themselves do not generate any application traffic and their main responsibility is to carry information packets between the clients and gateway points. Before any packet from the gateway reaches the client side (or vice versa), it might get relayed by one or more intermediate relay nodes. The gateway and the relay nodes transmit the packets belonging to multicast/broadcast applications mainly in a multicast/broadcast mode where information bits are transmitted over the same wireless channel (e.g., the same frequency band/sub-band, time slot, spreading code, etc.) using a multicast/broadcast MAC address or connection ID. Accordingly more than one receiver (e.g., end clients and/or wireless relays) listens and processes the multicast/broadcast packets.

In one embodiment, the nodes employ either a default mode or an enhanced mode of operation. In the default mode of operation, multicast/broadcast packets are not ACKed; hence, they are not retransmitted by the last sender. In the enhanced mode of operation, a subset of receivers is selected, and the receivers in the subset provide feedback about whether the packet has been successfully recovered at those locations.

Figure 2:
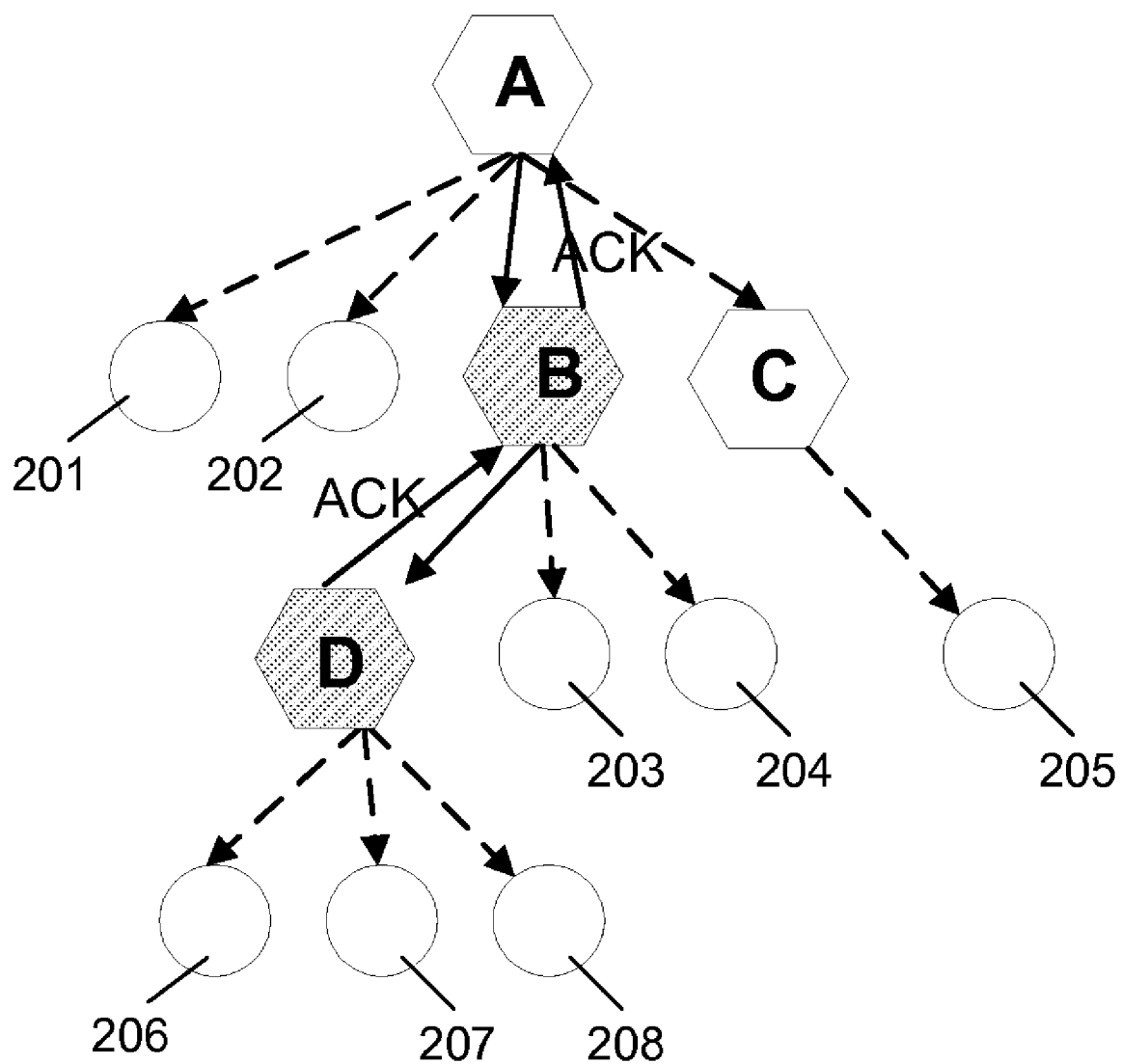
FIG. 2 illustrates an example network that performs selectively reliable link layer multicasting.

FIG. 2 depicts the scenario where network can be represented as a tree topology. Referring to FIG. 2, router A comprises a gateway router. Also relays B and D are designated as feedback nodes by the system, while relay C is not. Note that clients (nodes) 201-208 are also nodes in the network. When the LL of gateway router A sends a multicast packet, the packet is received by nodes 201, 202, B, and C. Nodes 201, 202, and C do not take any action regardless of whether the multicast packet has been received correctly or not. Since relay B is designated as the feedback node, if it recovers the packet, it sends back an ACK which triggers router A to send a new packet over the same channel. If the packet is not recovered successfully at relay B, no ACK is sent back and node A retransmits the multicast packet. Retransmissions end after a finite number of times or an ACK is received back from relay B or the retransmission deadline expires. When the packet is successfully recovered at relay B, it re-multicasts the same packet. The re-multicasted packet can be received at nodes 203, 204, and D. Since only relay D is designated as the feedback node, it ACKs the packet and relay (node) B retransmits the packet unless an ACK is received from relay D or a finite number of attempts failed already or the retransmission deadline expires. On the other hand, unlike relays B and D, relay C sends the multicast packet in an unreliable multicast mode to node 205 without any retransmissions in case of failures. In another embodiment, a NACK mechanism is used instead of an ACK-based feedback mechanism to support retransmissions. In other embodiments, different ARQ methods such as, for example, but not limited to stop-and-wait, go-back-N, selective-repeat, etc., may be used.

Figure 3:
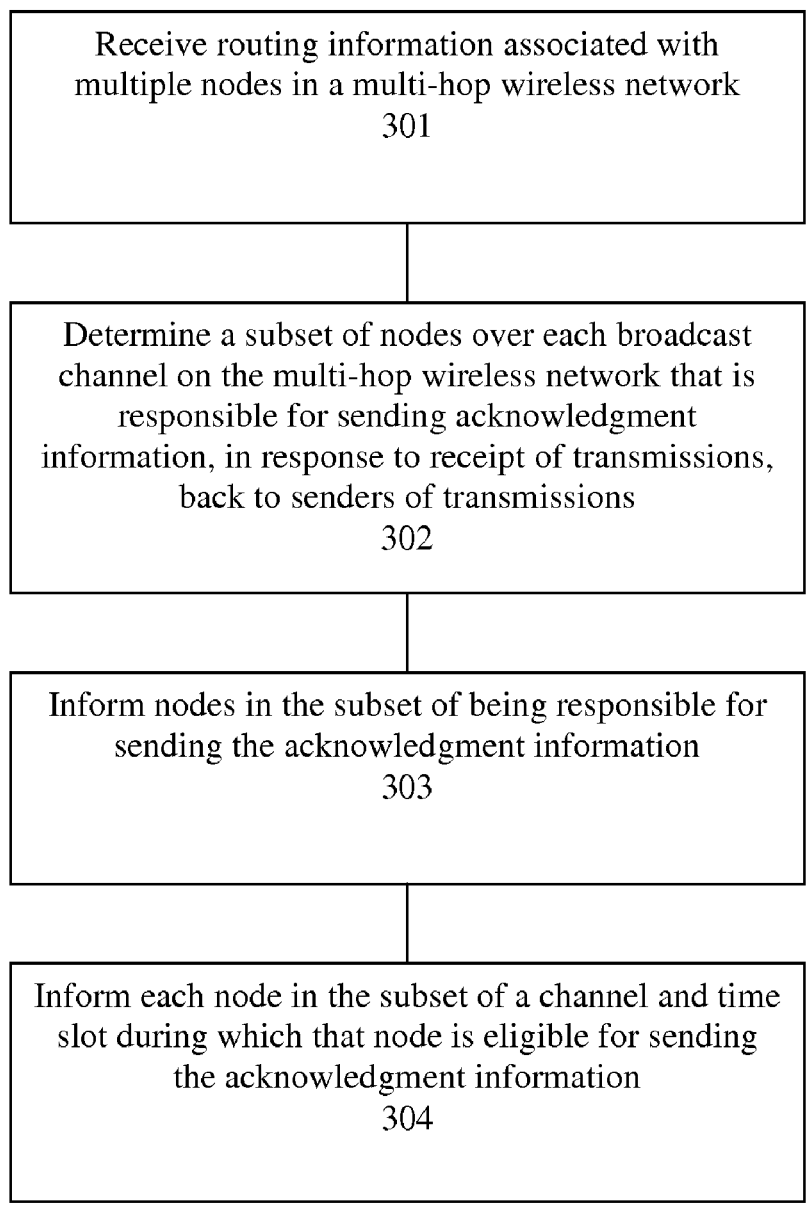
FIG. 3 is a flow diagram on one embodiment of a process to designate a node as a feedback node.

FIG. 3 is a flow diagram on one embodiment of a process to designate a node as a feedback node. The process is performed by processing logic that may comprise hardware (circuitry, dedicated logic, etc.), software (such as is run on a general purpose computer system or a dedicated machine), or a combination of both.

Referring to FIG. 3, the process begins by processing logic receiving routing/relaying/topology information associated with multiple nodes in a multi-hop wireless network (processing block 301). The nodes are communicably coupled in a tree or mesh arrangement via broadcast channels.

In response to the routing/relaying/topology information, processing logic determines a subset of nodes over each broadcast channel on the multi-hop wireless network that is responsible for sending acknowledgment information, in response to receipt of transmissions, back to senders of transmissions (processing block 302). In one embodiment, processing logic determines the subset of nodes by determining whether a node is serving a predetermined number of end users, verifying relative importance of service capacity of the node with respect to the parent node, determining whether the node has one or more predetermined channel conditions, and designating a node as a feedback node based on results of determining whether the node is serving a predetermined number of end users, verifying relative importance of service capacity of the node with respect to the parent node, and determining whether the node has one or more predetermined channel conditions. In one embodiment, processing logic designates the node as a feedback node if the service capacity of the node is above a service capacity threshold, relative service capacity is above a relative service capacity threshold, and channel quality from the parent node to the node is below a channel quality threshold.

In one embodiment, the acknowledgement information comprises an ACK. In another embodiment, the acknowledgement information comprises a NACK.

Next, processing logic informs nodes in the subset of being responsible for sending the acknowledgment information (processing block 303) and informs each node in the subset of a channel and time slot during which that node is eligible for sending the acknowledgment information (processing block 304).

Figure 4:
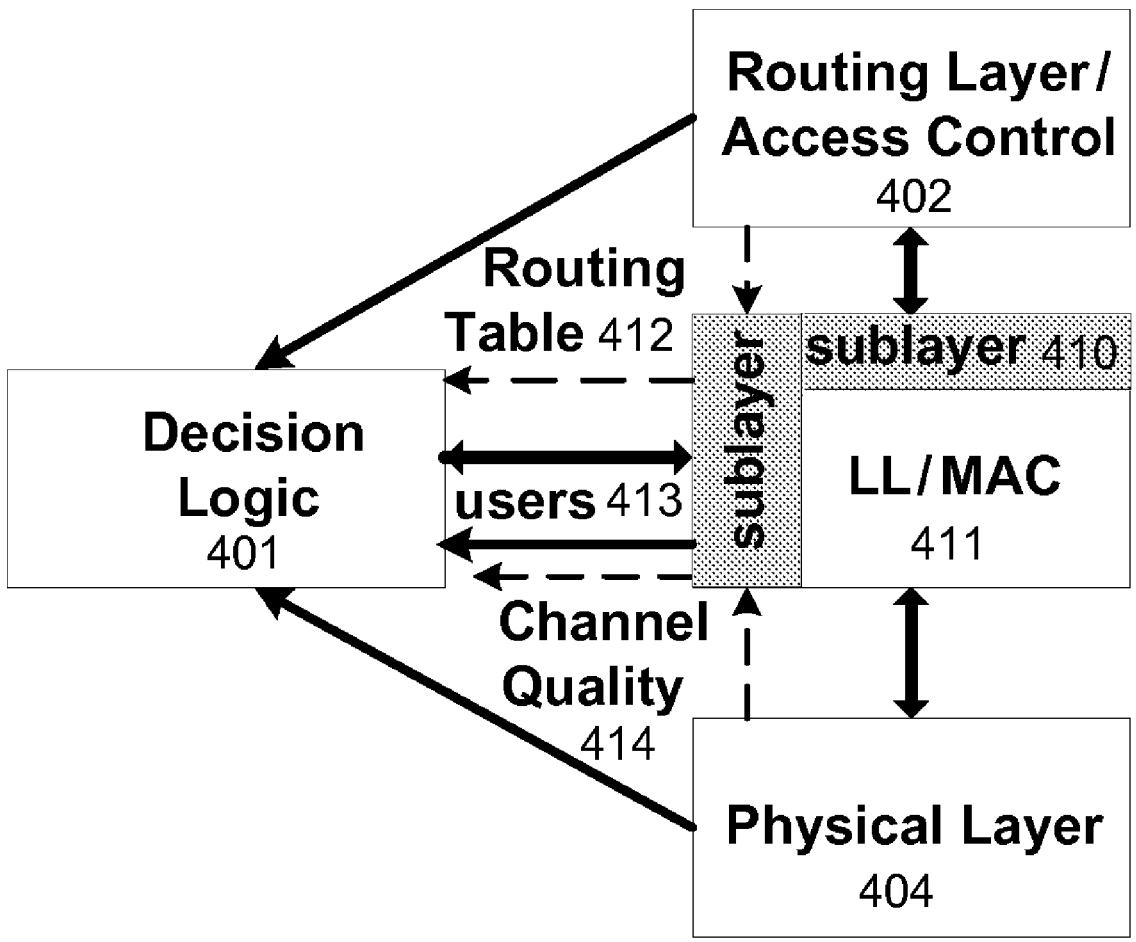
FIG. 4 is a block diagram of one embodiment of a node that enforces selectively reliable link layer retransmissions.

FIG. 4 is a block diagram of one embodiment of a node architecture that employs techniques disclosed herein. Note that other parts of the node have not been shown to avoid obscuring the invention. These include communication functionality of one or more transmitters and receivers, including their signal processing functionalities, as well as other control functionalities to control the node's functions.

Referring to FIG. 4, sublayer 410, which wraps around link and MAC layers 411, and decision logic 401 are the main components. Sublayer 410 is responsible of capturing and manipulating execution of multicast packets by appropriately modifying the MAC headers to select the proper transmission mode and (if such options are enabled) the schedules of the payload transmission and ACKs. Sublayer 410 also feeds decision logic 401 with the necessary parameters. In one embodiment, these parameters include information about multicast clients 413, routing tables 412, and channel quality 414. In one embodiment, sublayer 410 actively communicates with the routing/access control layer 402, physical layer 404 or even session management layers to discover the necessary information. In another embodiment, sublayer 410 captures and processes the packets exchanged between the layers to infer the targeted information.

Figure 5:
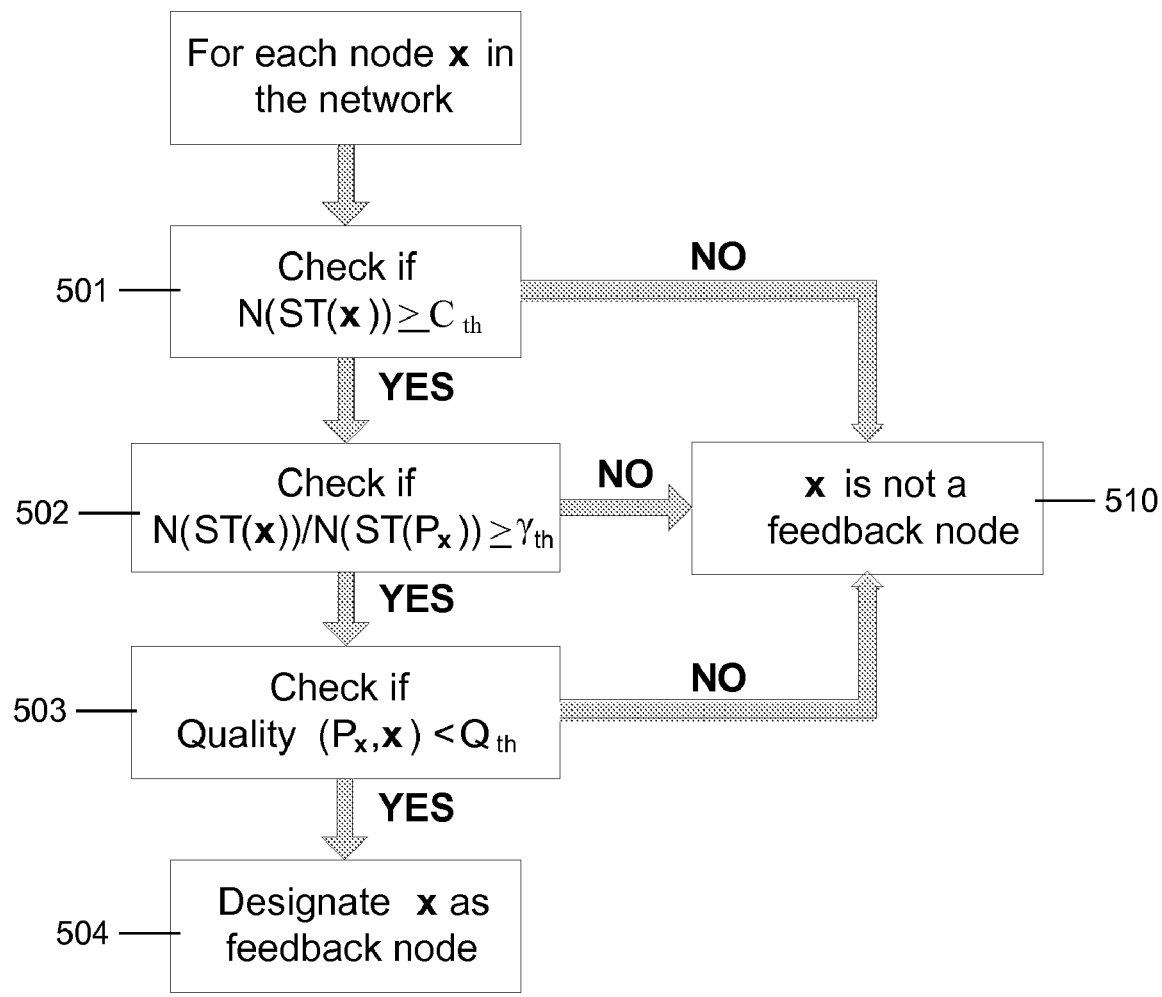
FIG. 5 is a flow diagram of one embodiment of a process for deciding whether a node is a feedback node.

FIG. 5 is a flow diagram of one embodiment of a process for determining whether a node should be designated as a feedback node. The process is performed by processing logic that may comprise hardware (circuitry, dedicated logic, etc.), software (such as is run on a general purpose computer system or a dedicated machine), or a combination of both. In one embodiment, this process is performed by the decision logic of FIG. 4.

Referring to FIG. 5, the process begins with processing logic determining whether each node x in the wireless network is serving a critical number of end users (processing block 501). In one embodiment, processing logic determines whether each node x in the wireless network is serving a critical number of end users by comparing the service capacity $N(ST(x))$ (i.e., the number of client nodes under the subtree rooted at the node of interest, namely node x) with the service capacity threshold $C_{th}$ (the number of clients that are served). For instance, in FIG. 1, $N(ST(A))=8$, $N(ST(B))=5$, $N(ST(C))=1$, $N(ST(D))=3$. $C_{th}$ represents a configuration parameter that can be set beforehand by the network operator. If $C_{th}$ is set to 2, decision metric eliminates relay C and only A, B, and D are eligible as feedback nodes. The value of $C_{th}$ is implementation dependent, and is set by the network operator. In one embodiment, the value of $C_{th}$ depends on the total number of users in the system. $C_{th}$ value is used as a rigid constraint that sets a lower bound on being a critical node. It is typically set as a percentage of the total number of users in the system. Recommended value range for $C_{th}$ is between 1% and 25% of the total number of users in the system. For instance, $C_{th}=2$ in a system with 20 users corresponds to selecting 10% of the users as a critical mass for QoS ensurance.

After determining whether each node x in the wireless network is serving a critical number of end users, processing logic verifies the relative importance of the service capacity $N(ST(x))$ with respect to its parent node of node x, which is referred to as $P_x$ for purposes herein (processing block 502). In one embodiment, processing logic verifies the relative importance of the service capacity $N(ST(x))$ with respect to its parent node $P_x$ by comparing the ratio $\gamma=N(ST(x))/N(ST(P_x))$ with threshold $\gamma_{th}$. In one embodiment, the ratio is a number between 0 and 1, and it represents the relative service capacity. This criterion is useful to avoid unnecessary slow downs in the system due to retransmissions to a designated node with bad channel conditions. For instance, in one embodiment, node B has relative service capacity of $\gamma=5/8$, serving most of the end users. It is more acceptable for node B to slow down the other users served by node A but not by node B, as it has larger relative service capacity. Again, $\gamma_{th}$ is a parameter of choice by the network operator. Typical values for $\gamma_{th}$ are larger than or equal to 0.3, but are implementation and performance target dependent.

Next, processing logic checks whether any of the nodes that passed the first two steps have critical channel conditions (processing block 503). There may be one or more channel conditions examined. In one embodiment, one of the channel conditions checked is whether the channel quality for the transmissions to node x from its parent node $P_x$ on the routing tree is below the desired level (e.g., $Q_{th}$ in FIG. 4) to achieve a target bit error rate performance. In one embodiment, the quality measure is the signal to interference and noise ratio (SINR). If there are nodes that cannot achieve SINR target through coding, link layer retransmissions accompany the channel coding. Note that examples of other channel conditions that may be checked include block/packet error rates and the packet delays (to keep them within a certain window, while improving the block/packet error rates).

If the nodes that have service capacity above $C_{th}$ and relative service capacity above $\gamma_{th}$, but channel quality is below $Q_{th}$, then processing logic designates the nodes as feedback nodes (processing block 504). If not, then processing logic does not designate the nodes as feedback nodes (processing block 510).

In one embodiment, the process of FIG. 5 is executed at a central node (e.g., node A in FIG. 2) and communicated to the other relays. In an alternative embodiment, the process of FIG. 5 is executed in a distributed fashion at each relay node.

In another embodiment, LL/MAC reliable unicasting is used to emulate the behavior of selectively reliable LL/MAC broadcasting/multicasting. One use can be described in the context of 802.11-based multi-hop wireless networks where wireless access points (APs) used to relay packets between gateway access point and mobile users. As above, a subset of wireless APs are designated as feedback points, but for each transmission only one AP is selected as the feedback node among all the next-hop receivers that are subscribed to the same multicast session. In one embodiment, the decision criterion is the "highest service capacity" and as a tie-breaker, the decision criterion includes "lowest channel quality" and if still tied "highest MAC address". Note that other criteria can also be adopted within this framework or different ordering of criteria can be used (e.g., instead of checking highest service capacity, worst channel quality can be checked first and service capacity can be used as tie-breaker condition).

Whenever a packet for a multicast/broadcast session is to be transmitted, 802.11 MAC uses the unique MAC address of the feedback node as the destination MAC address in the MAC header and the packet is sent in the unicast mode. Since unicast mode is reliable, by default, the sender waits for ACK from the feedback node. In default mode, however, the rest of the receivers drop the packets sent in such a unicast mode, because the destination MAC address does not match to their own. This problem can be circumvented by forcing the receivers of the multicast session to listen in promiscuous mode so that they pass all the successfully received packets to upper layer regardless of the destination MAC address. In one embodiment, the upper layer software agent verifies whether the received packet is of interest by parsing the IP header, e.g., whether the IP address and port matches to the one used for any of the multicast sessions of interest. In another embodiment, such as, for example, an 802.16 implementation, the upper layer system agent verifies whether the received packet is of interest by comparing the CID to the multicast CID. If a match is found and the receiver is a client, the packet is passed to the next layer. If the receiver is another relay, software agent checks whether a designated feedback node exists among the next-hop of receivers. If there is, the destination MAC address is set to the feedback node and message is passed back to the MAC layer. If there is not, the destination MAC address is set to the MAC multicast or broadcast address and message is passed back to the MAC layer.

At least one embodiment of the invention provides an increased reliability against the critical transmission failures for multicast/broadcast applications over multicast/broadcast channels in multi-hop networks. Under the conditions where there are only a few critical intermediate wireless relays at each hop, the procedure allows an intelligent mechanism to suppress the feedback from the receiving nodes. Since one embodiment of the method provides a reliable link layer in critical directions of multicast information dissemination, it presents better QoS for a larger set of end users.

Whereas many alterations and modifications of the present invention will no doubt become apparent to a person of ordinary skill in the art after having read the foregoing description, it is to be understood that any particular embodiment shown and described by way of illustration is in no way intended to be considered limiting. Therefore, references to details of various embodiments are not intended to limit the scope of the claims which in themselves recite only those features regarded as essential to the invention.

We claim:

1. A method comprising:
   receiving information associated with a plurality of nodes in a multi-hop wireless network, the plurality of nodes communicably coupled in an arrangement via a plurality of broadcast channels; and
   determining a subset of the plurality of nodes over each broadcast channel on the multi-hop wireless network that is responsible for sending acknowledgment information, in response to receipt or lack of receipt of transmissions, back to senders of transmissions; wherein determining the subset of nodes comprises:
   determining whether a node is serving a predetermined number of end users;
   verifying relative importance of service capacity of the node with respect to a parent node;
   determining whether the node has one or more predetermined channel conditions; and
   designating the node as a feedback node based on results of determining whether the node is serving the predetermined number of end users, verifying relative importance of service capacity of the node with respect to the parent node, and determining whether the node has the one or more predetermined channel conditions.

2. The method defined in claim 1 wherein determining whether a node is serving the predetermined number of end users comprises comparing whether service capacity of the node is greater than a service capacity threshold, the service capacity being the number of clients under a subtree rooted at the node.

3. The method defined in claim 1 wherein verifying relative importance of service capacity of the node with respect to the parent node comprises comparing a ratio of service capacity of the node to service capacity of the parent node with a relative service capacity threshold.

4. The method defined in claim 1 wherein determining whether the node has predetermined channel conditions comprises determining whether channel quality for transmissions to the node from the parent node is below a channel quality threshold.

5. The method defined in claim 4 wherein the channel quality threshold is one selected from a group consisting of:
   an amount below which a target bit error rate cannot be achieved for the transmissions to the node from the parent node, and
   a packet error rate.

6. The method defined in claim 4 wherein the channel quality threshold is based on one selected from a group consisting of:
   a signal to interference noise ratio, and
   a packet error rate.

7. The method defined in claim 1 wherein designating the node as a feedback node occurs if the service capacity of the node is above a service capacity threshold, relative service capacity is above a relative service capacity threshold, and channel quality from the parent node to the node is below a channel quality threshold.

8. The method defined in claim 1 further comprising:
   informing nodes in the subset of being responsible for sending the acknowledgment information; and
   informing each node in the subset of a channel and time slot during which said each node is eligible for sending the acknowledgment information.

9. The method defined in claim 1 wherein the acknowledgement information comprises one selected from a group consisting of ACK and NACK.

10. A non-transitory computer readable medium storing a computer program which, when executed by a system, cause the system to perform a method comprising:
    receiving information associated with a plurality of nodes in a multi-hop wireless network, the plurality of nodes communicably coupled in an arrangement via a plurality of broadcast channels; and
    determining a subset of the plurality of nodes over each broadcast channel on the multi-hop wireless network that is responsible for sending acknowledgment information, in response to receipt or lack of receipt of transmissions, back to senders of transmissions, wherein determining the subset of nodes comprises:
    determining whether a node is serving a predetermined number of end users;
    verifying relative importance of service capacity of the node with respect to a parent node;
    determining whether the node has one or more predetermined channel conditions; and
    designating the node as a feedback node based on results of determining whether the node is serving the predetermined number of end users, verifying relative importance of service capacity of the node with respect to the parent node, and determining whether the node has the one or more predetermined channel conditions.

11. A non-transitory computer readable medium defined in claim 10 wherein determining whether the node is serving a predetermined number of end users comprises comparing whether service capacity of the node is greater than a service capacity threshold, the service capacity being the number of clients under a subtree rooted at the node.

12. A non-transitory computer readable medium defined in claim 10 wherein verifying relative importance of service capacity of the node with respect to the parent node comprises comparing a ratio of service capacity of the node to service capacity of the parent node with a relative service capacity threshold.

13. A non-transitory computer readable medium defined in claim 10 wherein determining whether the node has predetermined channel conditions comprises determining whether channel quality for transmissions to the node from the parent node is below a channel quality threshold.

14. A non-transitory computer readable medium defined in claim 13 wherein the channel quality threshold is one selected from a group consisting of:
an amount below which a target bit error rate cannot be achieved for the transmissions to the node from the parent node, and
a packet error rate.

15. A non-transitory computer readable medium defined in claim 13 wherein the channel quality threshold is based on one selected from a group consisting of:
signal to interference noise ratio, and
a packet error rate.

16. A non-transitory computer readable medium defined in claim 10 wherein designating the node as a feedback node occurs if the service capacity of the node is above a service capacity threshold, relative service capacity is above a relative service capacity threshold, and channel quality from the parent node to the node is below a channel quality threshold.

17. A non-transitory computer readable medium defined in claim 10 wherein the method further comprises:
informing nodes in the subset of being responsible for sending the acknowledgment information; and
informing each node in the subset of a channel and time slot during which said each node is eligible for sending the acknowledgment information.

18. A device for use with a plurality of nodes in a multi-hop wireless network, the plurality of nodes communicably coupled in a tree arrangement via a plurality of broadcast channels, the node comprising:
routing layer and access control logic to provide information associated with the plurality of nodes; and
decision logic, responsive to the routing information and a channel quality information, to determine a subset of the plurality of nodes that is responsible for sending acknowledgment information back to an original sender in response to receipt or lack of receipt of transmissions,
wherein the decision logic determines the subset of nodes by determining whether a node is serving a predetermined number of end users;
verifying relative importance of service capacity of the node with respect to a parent node;
determining whether the node has one or more predetermined channel conditions; and
designating the node as a feedback node based on results of determining whether the node is serving the predetermined number of end users, verifying relative importance of service capacity of the node with respect to the parent node, and determining whether the node has the one or more predetermined channel conditions.

19. The device defined in claim 18 wherein determining whether the node is serving a predetermined number of end users comprises comparing whether service capacity of the node is greater than a service capacity threshold, the service capacity being the number of clients under a subtree rooted at the node.

20. The device defined in claim 18 wherein verifying relative importance of service capacity of the node with respect to the parent node comprises comparing a ratio of service capacity of the node to service capacity of the parent node with a relative service capacity threshold.

21. The device defined in claim 18 wherein determining whether the node has predetermined channel conditions comprises determining whether channel quality for transmissions to the node from the parent node is below a channel quality threshold.

22. The device defined in claim 18 wherein the decision logic designates the node as a feedback node if the service capacity of the node is above a service capacity threshold, relative service capacity is above a relative service capacity threshold, and channel quality from the parent node to the node is below a channel quality threshold.

* * * * *